June 18, 1929.   L. C. SWIM   1,717,900
DISPENSING BAG UNIT

Filed Jan. 28, 1928

INVENTOR
L. C. Swim
BY
ATTORNEY

Patented June 18, 1929.

1,717,900

UNITED STATES PATENT OFFICE.

LOWELL C. SWIM, OF MODESTO, CALIFORNIA.

DISPENSING-BAG UNIT.

Application filed January 28, 1928. Serial No. 250,247.

This invention relates to the shipping and retail dispensing of fruit and other products, and especially to such products as are shipped in bulk in boxes from which they are retained in relatively small quantities to the individual consumer.

Using grapes as an example, this fruit is now shipped in boxes of twenty pounds or more, in which boxes they are kept in the retail store and from which they are sold in small quantities in any paper bags which the store keeper may have on hand.

The boxes are usually marked with the individual trade mark of the shipper or grower for the purpose of establishing the identity of his goods in the minds of buyers, so that the latter will ask for the particular brand of goods by name if they prove satisfactory, thereby increasing the sales and consequently the income of the grower.

As far as the retail store owners themselves are concerned, this works out satisfactorily, but since the grapes as stated are at present sold in plain bags, there is nothing to keep the particular brand of grapes in the mind of the individual purchaser and consumer after he leaves the store with his purchase, and he therefore does not know or remember what particular brand to subsequently ask for.

The grower or shipper therefore does not obtain the full benefit of his trade mark and other advertising on the box and the consumer likewise loses the benefits otherwise derived from subsequently obtaining the same grapes which in the first place satisfied the requirements.

The principal object of my invention, therefore, is to arrange for the sale of grapes and like products in such a manner as to redound to the benefit of the grower and the continued satisfaction of the individual consumer by providing, with each box of grapes, a unitary series or pack of bags for the retail dispensing of the grapes, which are marked with the same trade mark as is on the box, as well as with any other advertising matter which the grower may desire to possibly further the sale of his products.

In this manner the trade name of the grapes or the name of the grower or shipper is retained in the mind of the consumer as long as he keeps the bag; the expense of upkeep to the store keeper is lessened since the bags are provided for him with the grapes, and the additional cost to the grower or shipper by reason of his having to provide the bags is more than offset by the benefits ultimately accruing to him through the wider distribution and advertising value of his brand-name.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
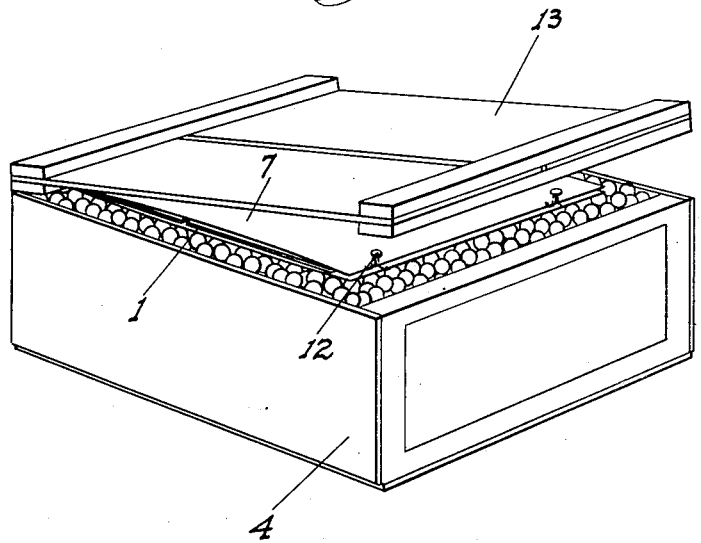
Fig. 1 is a perspective view of a fruit box showing my bag unit as packed therein.
Figure 2:
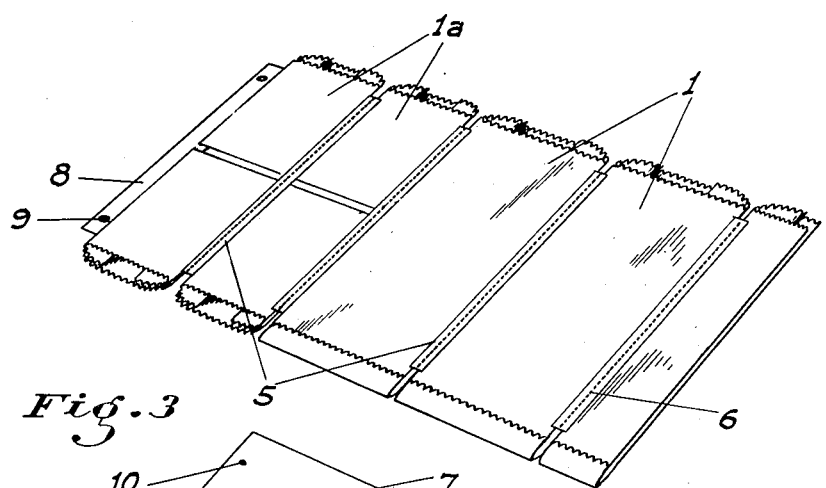
Fig. 2 is a fragmentary plan view of the unitary arrangement of the bags themselves.
Figure 3:
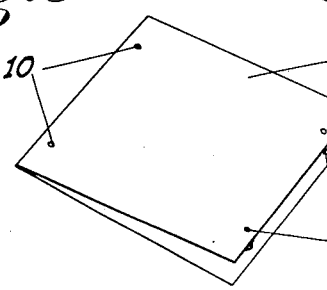
Fig. 3 is a perspective view of a folder in which the bag pack is initially placed.

Referring now more particularly to the characters of reference on the drawings, the numerals 1 and 1$^a$ denote paper bags of different sizes and of common construction. Each bag has the same trade or other name as is on the label etc., on the box 4 in which the grapes and the like are to be shipped. These bags are initially arranged as a unitary set or pack but being connected together by suitable means. Such means in this instance is shown in the form of paper strips 5 which are secured along the adjacent edges of adjacent bags and are perforated or otherwise weakened as at 6 lengthwise between the bags. These strips also serve as hinges for the folding of the sheet of bags thus formed, so as to provide as many superimposed separate layers of bags as may be necessary to enable the pack to be accommodated in the box without folding or bending the bags themselves.

Before placing the bag pack in the box and after said pack is folded the same is placed in a folder 7. One or both outer faces of the folder are marked with the brand-name of the goods, and also with such other printing and advertising matter as the shipper may desire, so as to form an attractive show or window display card when disassociated from the bag pack. To prevent the bags from sliding out of the folder, a flap 8 is secured to one end of the pack, which flap is provided with holes 9 to cooperate with holes 10 in the folder adjacent the pack thereof. This arrangement enables ordinary metal clips or the like being placed through these holes which of course are easily removed when desired. The folder adjacent its outer edges is also provided with other holes 11 to receive removable clips 12 when the bag pack has been placed therein.

The bags are thus assembled when being manufactured or after they are printed and are then placed on top of the fruit in the box before the lid 13 is nailed thereon. When the lid is removed the folder is immediately exposed to view and is then removed by the shop keeper. The bag pack is then removed from the folder and placed where handy for use in connection with the sale of the fruit from the particular box. The folder itself is then placed where it will serve as a display or advertising card for the particular brand of fruit. The individual bags are separated from the unitary pack at any time by tearing along the perforations of the connecting strips 5. The folder, besides providing a means for retaining the bags in unitary form and subsequently serving as a display card, also prevents the fruit from directly contacting with the bags so as to avoid the possibility of the fruit staining or otherwise damaging the lower layer of bags.

While I have particularly designated this arrangement as being intended for use in connection with the shipping and sale of grapes, it will be evident that its use is not limited to grapes or indeed to any fruit but may be used in connection with the sale of any products which are now shipped in bulk to be subsequently sold in relatively small lots from the shipping container.

While I have shown and described my invention in connection with a box, it will be evident that it may be applied to barrels, sacks and other forms of container with equal facility.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims:

Having thus described my invention what I claim as new and useful and desire to secure by Letters Patent is:

1. Goods dispensing means for use in connection with a shipping container to contain goods in bulk, comprising a pack of dispensing bags arranged as a foldable unit, and a folder separate from the unit of a size to receive the unit when folded and to fit under the lid of the container.

2. Goods dispensing means for use in connection with a shipping container to contain goods in bulk, comprising a pack of dispensing bags arranged as a foldable unit, a folder separate from the unit of a size to receive the unit when folded and to fit under the lid of the container, a flap on one end of the pack, the folder and flap having alined holes, and removable clips for placement through the holes to maintain the bag unit in detachable association with the folder.

3. Goods dispensing means for use in connection with a shipping container to contain goods in bulk, comprising a pack of dispensing bags arranged as a foldable unit to fit, when folded, under the lid of the container; said pack comprising bags of different sizes.

In testimony whereof I affix my signature.

LOWELL C. SWIM.